Jan. 5, 1971  A. A. YEE  3,552,787
WIRE CAGE-TYPE SPLICE SLEEVE FOR REINFORCING BARS
Filed Oct. 28, 1968  3 Sheets-Sheet 1
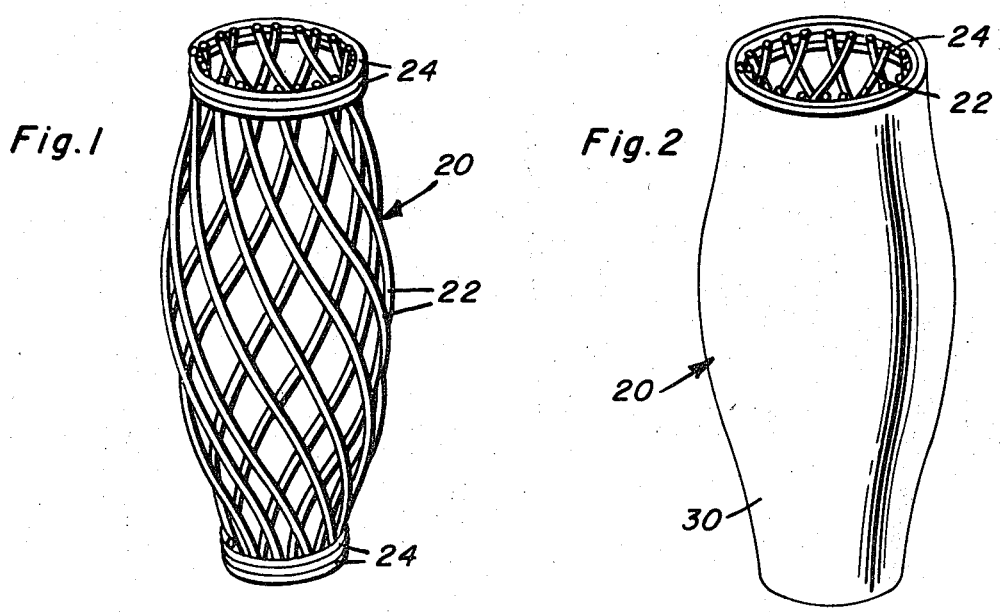
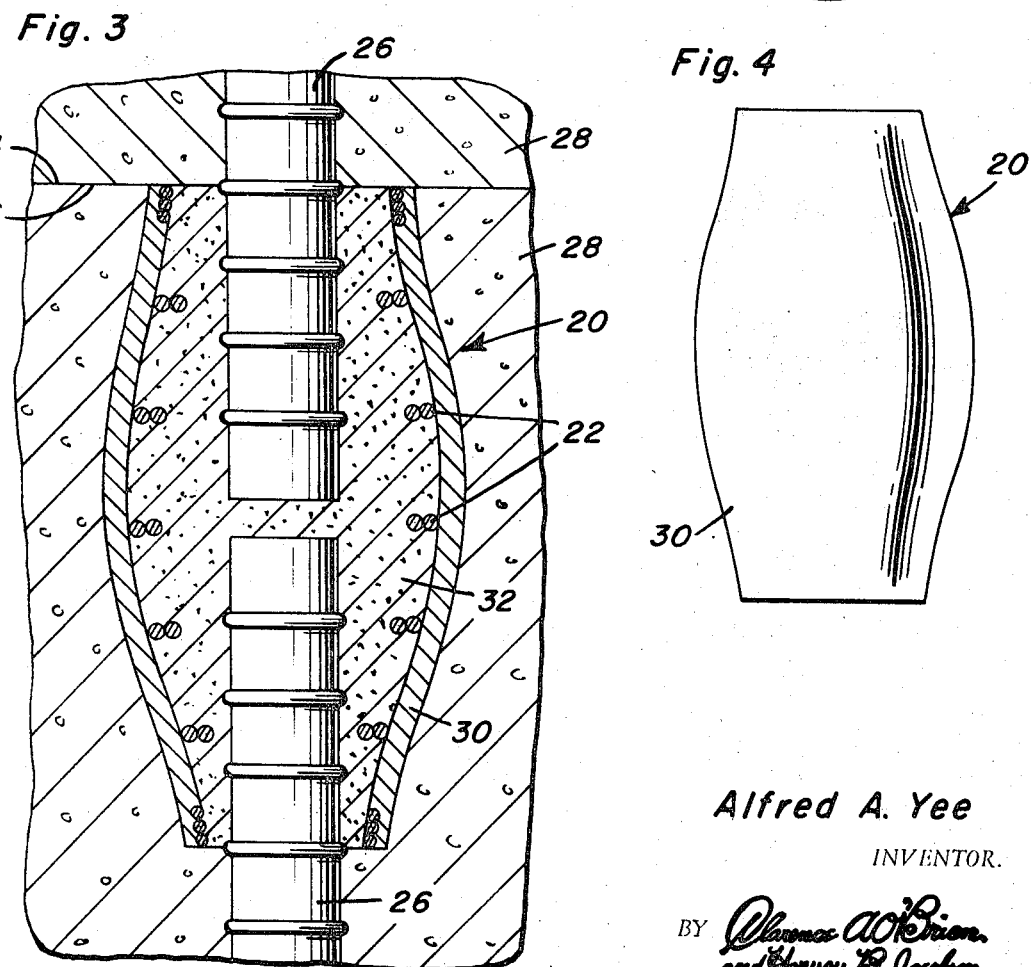
Alfred A. Yee
INVENTOR.

Jan. 5, 1971    A. A. YEE    3,552,787
WIRE CAGE-TYPE SPLICE SLEEVE FOR REINFORCING BARS
Filed Oct. 28, 1968    3 Sheets-Sheet 2

Alfred A. Yee
INVENTOR.

BY *Clarence A. O'Brien*
*and Harvey B. Jacobson*
Attorneys

Alfred A. Yee
INVENTOR.

United States Patent Office 3,552,787
Patented Jan. 5, 1971

3,552,787
WIRE CAGE-TYPE SPLICE SLEEVE FOR REINFORCING BARS
Alfred A. Yee, 3169 Alika Ave.,
Honolulu, Hawaii 96817
Continuation-in-part of application Ser. No. 740,646,
June 27, 1968. This application Oct. 28, 1968,
Ser. No. 771,262
Int. Cl. F16b 7/00
U.S. Cl. 287—108
11 Claims

ABSTRACT OF THE DISCLOSURE

Elongated splice sleeve for reinforcing bars defined by a series of generally aligned wire coils, either helical or annular, engaged with and interconnected by generally longitudinally extending wires welded thereto. A coating of cementitious material is applied about the exterior of the wires for defining a grout containing interior, with the overall sleeve being either of a cylindrical configuration or of a configuration tapering from a maximum diameter at the center thereof to minimum diameters at the opposed ends. The necessity for the cementitious coating can be avoided by a positioning of the coils in direct engagement with each other.

This is a continuation-in-part of application Ser. No. 740,646, filed June 27, 1968, for Splice Sleeve for Reinforcing Bars.

The instant invention is generally concerned with the joining or splicing of reinforcing bars, and is more particularly directed to the provision of a splice sleeve wherein the sleeve, through the unique construction thereof, enables the formation of a joint between adjacent bars which is capable of specifically accommodating tension thereacross by means of a grout locking arrangement effected between the sleeve and the adjoining bars connected thereby.

Splicing sleeves for reinforcing bars are of course generally known. However, the primary function of such known sleeves is to align adjacent reinforcing bars for the accommodation of compression across the joint, such known sleeves being incapable of accommodating tension. Accordingly, it is a significant object of the instant invention to provide a unique splice sleeve which will not only function in the conventional manner so as to align rods for the accommodation of a compressive force across the joint therebetween, but also, through the construction of the sleeve and the locking arrangement provided between the sleeve and the rod, produce a joint fully capable of accommodating a substantial amount of tension across the joint such as heretofore not possible with conventional splice sleeves.

The advantages sought by the instant invention are to be achieved by the provision of a wire cage type sleeve wherein the body of the sleeve is formed by a plurality of coils of wire interconnected by a plurality of substantially longitudinally extending wires so as to define either a cylindrical configuration or a configuration tapering from a maximum diameter at the center thereof to reduced diameters at the opposed ends. The wires which define the sleeves provide a means whereby an appropriate expanding grout introduced into the sleeve can intimately engage and lock to a sleeve, as well as to the ribs defined on conventional reinforcing bars or rods. The wire-like nature of the splice sleeve tends, in some specific forms thereof, to actually increasingly grip within the joint upon the application of tension thereto. Further, a coating of cementitious material can be provided about the cage both as a means for excluding concrete in a preforming situation and as a means for retaining the expanding grout when exposed bars are to be joined.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a splice sleeve constructed in accordance with the instant invention;

FIG. 2 is a perspective view of the sleeve of FIG. 1 with a coating of cement, plaster or the like thereon;

FIG. 3 is an enlarged cross-section view through a rod joint utilizing the splice sleeve of the instant invention;

FIG. 4 is an elevational view of the coated sleeve of FIGS. 2 and 3;

Figure 5:
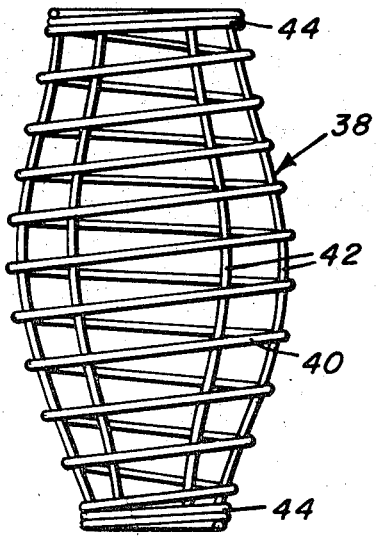
FIG. 5 is an elevational view of a modified form of sleeve wherein a helicoidal wire is engaged about and fixed to plurality of generally vertical wires.

Referring now more specifically to the drawings, reference numeral 20 is used to designate one form of the splice sleeve constructed in accordance with the instant invention. This sleeve 20, noting FIGS. 1–4 in particular, is defined by two sets of oppositely directed helical or spiral steel wires 22 crossing each other in an open weave along the length of the sleeve and forming enlarged diamond-shaped spaces. All of the wires 22 of one set overlie all of the wires 22 of the other set and in effect constitute an outer layer. The upper and lower ends of the crossed steel wires 22 are encircled by two or three abutting substantially annular coils 24, these opposed ends being welded to the coils 24 whereby a positive fixing of the wires 22 in the desired pattern is effected. In addition, if so desired, the wires 22 can be welded to each other at the points of overlap, thus further rigidifying the sleeve 20.

As will be readily apparent from the drawings, the sleeve 20 formed by the crossed wires 22 is so configured as to define circular cross-sections of varying sizes throughout the length thereof, the cross-sectional area of the sleeve 20 being greatest at the center thereof and the smallest at the opposed ends.

Figure 16:
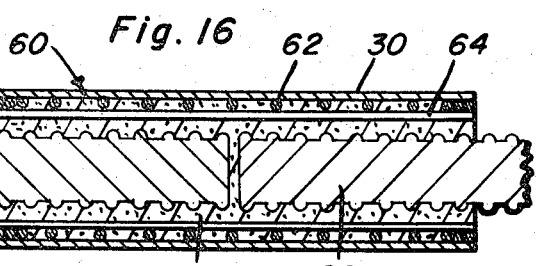
FIG. 16 is a cross-sectional view through a rod joint with one of the sleeves in accordance with the instant invention being utilized.

The sleeve 20 is equally adaptable for use in interlocking reinforcing rods 26 set within precast sections 28 to be assembled, noting FIG. 3 as an example thereof, or exposed reinforcing rods which are subsequently to be embedded within a pour, as suggested in FIG. 16 with another form of such sleeve. In either situation, a cement, plaster or similar material coating 30 is formed about the exterior of the sleeve 20. This coating 30, in the environment of FIG. 3, prevents an intrusion of the poured concrete of the section 28 within which the sleeve 20 is to be embedded into the interior of the sleeve 20, retaining the interior of the sleeve 20 empty for the reception of the rod binding expanding grout 32 which is to be introduced thereinto. In the environment of FIG. 16, it will be appreciated that the external coating 30 functions so as to retain the rod binding filler of expanding grout 32. Incidently, this expanding grout 32 can be of any commercially available type such as Kemox-G, a product of Sika Chemical Corp. or Embeco, a product of Master Builders Corp. This expanding grout 32, because of the nature thereof, hardens and expands into intimate contact with and about the wires which make up the sleeve, as well as the ribbed exterior of the rods 26, forming a positive locking of the rods within the sleeve.

In addition to the positive lock effected by the expanding grout 32 intimately engaging the ribbed rods 26 and the wires of the sleeve 30, the tapered interior construction of the sleeve 20 provides a significant contribution to the strength of the tension accommodating interlock in that any tendency for the rods 26 to move outward relative to the sleeve results in a wedging effect produced by the tapered configuration of the grout 32 trying to move through the restricted opening at the end of the sleeve 20 through which the corresponding rod 26 projects. Finally, additional stability is introduced into the joint in that any tension introduced into the rods 26, and consequently into the sleeve 20, will result in a tendency for the wires 22 to straighten, hence creating an additional compressive force on the centrally received reinforcing bars or rods 26 through the intimately engaged expanded grout 32.

In the environment of FIG. 3, the lower section 28, which as an example may be a precast column, will be formed with the sleeve 20 embedded therein and flush with the top 34, the reinforcing rod or bar 26 of this lower precast member 28 terminating at a central point along the length of the sleeve 20 corresponding to the point at which the diameter of the sleeve 20 is at its maximum. The second precast section, which also may be in the nature of a precast column, is formed with the reinforcing bar 26 therein projecting beyond the lower face 36 a distance contemplated to enable its insertion within the sleeve 20 to the maximum diameter of the sleeve just short of the lower bar 26 upon an engagement of the bottom face 36 of the upper member with the top face 34 of the lower member. Thus, just prior to positioning of the upper precast member 28, the sleeve 20 will be filled with an expanding grout 32 through the open upper end of the sleeve 20, after which the upper column or member 28 will be positioned with the introduction of the downwardly extending end of the upper rod 26 forcing the grout 32 into intimate contact with both the rods and the internally exposed wires of the sleeve 20. When the grout 32 hardens, expanding during the process, a permanent tension accommodating joint is formed. Incidently, in order to facilitate the alignment of the precast sections 28, the upper or rod-receiving end of the sleeve 20 can be slightly enlarged, as illustrated, relative to the lower embedded end of the sleeve 20. However, it should be appreciated that the diameter at the upper end of the sleeve is still to be substantially less than at the central portion of the sleeve 20 so as to provide for the desired formation of a grout "wedge." By the same token, if the sleeve 20 is to be utilized so as to secure two exposed rods, as suggested in FIG. 16, no problem of alignment will exist, and the exposed ends of the sleeve 20 can be of the same diameter.

It will of course be appreciated that various modifications of the above described basic sleeve can be resorted to while still incorporating the particular advantages, or at least a substantial portion thereof, discussed supra. For example, in the form of sleeve 38 illustrated in FIG. 5, a single helicoidal wire 40 spirally encircles a plurality of generally vertically extending centrally bulged wires 42 so as to arrive at a sleeve configuration quite similar to that of sleeve 20. The upper and lower ends of the vertical rods 42 are encircled by two or three adjacent substantially annular coils 44, which may be continuations of the spiral wire 40, with the ends of the rods 42 being welded thereto. In addition, if so desired, or deemed necessary, the convolutions of the wire 40 can also be welded to the encircled rods 42.

Figure 6:
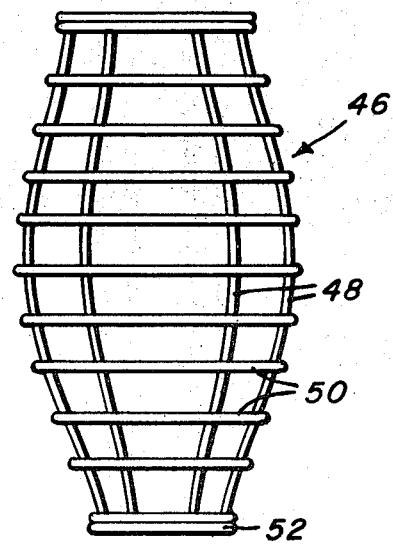
FIG. 6 is an elevational view of yet another sleeve wherein annular coils are utilized.

In the form of sleeve 46, illustrated in FIG. 6, the vertical rods 48, which are the equivalent of the rods 42, are encircled by annular coils 50 welded to the vertical rods 48 in longitudinally spaced parallel relation to each other along the length of the rods 48, the opposed ends of the sleeve 46 being finished by abutting coils 52 welded to the ends of the vertical laterally bulging wires 48.

Figure 7:
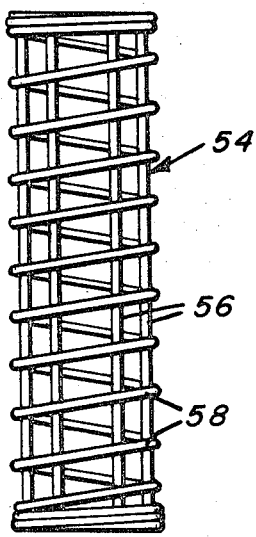
FIGS. 7 and 8 illustrate further modified forms wherein the sleeve assumes a cylindrical configuration.

FIG. 7 illustrates another form of sleeve 54 which is of a straight cylindrical configuration including a plurality of straight vertical rods 56 encircled by a plurality of coils defined by a single helicoidal wire 58.

Figure 8:
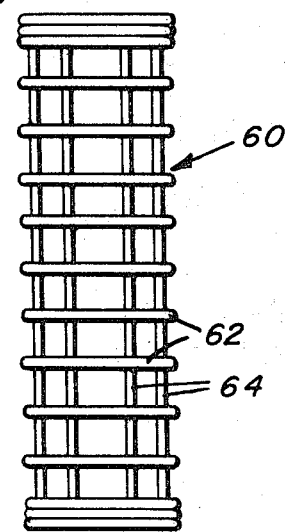
Figure 9:
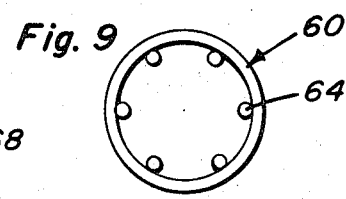
FIG. 9 is a top plan view of the form of FIG. 8.

FIG. 8 illustrates a sleeve 60 which differs from the sleeve 54 in that the coils are defined by annular rings of wire 62 welded to the vertical wires 64. It will be appreciated that both cylindrical sleeves 54 and 60 are finished at the opposed ends thereof with two or three abutting coils surrounding and welded to the opposite ends of the vertical wires.

Figure 10:
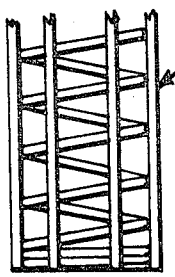
FIGS. 10 and 11 illustrate modified forms wherein the vertical rods are positioned exteriorly of the coils.
Figure 11:
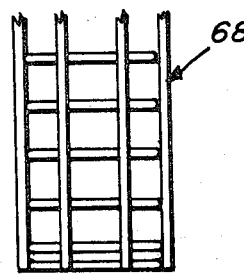
Figure 12:
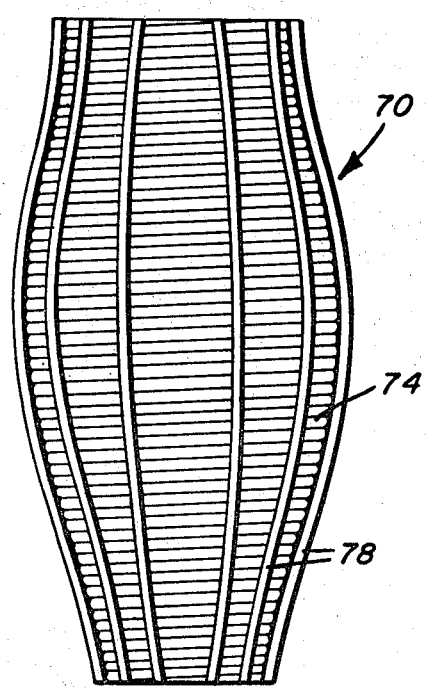
FIGS. 12 and 13 illustrate forms of the sleeve of the instant invention wherein the coils are in engagement with each other.
Figure 13:
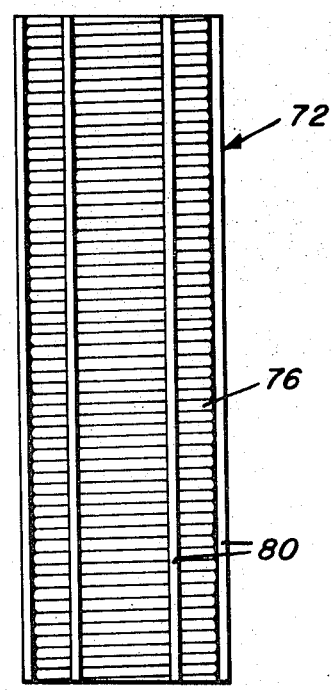
Figure 14:
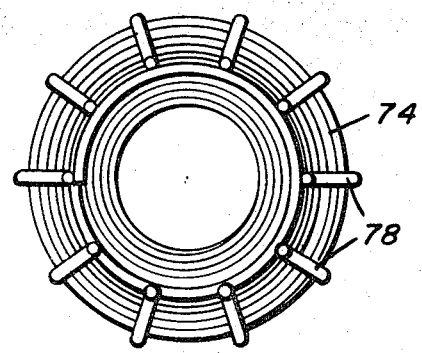
FIGS. 14 and 15 illustrate top plan views of the sleeves of FIGS. 12 and 13, respectively.
Figure 15:
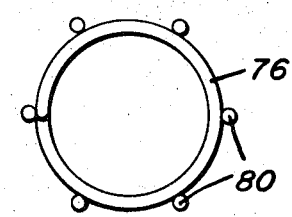

FIGS. 10 and 11, illustrating sleeves 66 and 68 similar to the sleeves 54 and 60, suggest a further modification which is easily applicable to all of the sleeves illustrated in FIGS. 5 through 8, such being the provision of the vertical wires exteriorly of the coils. Further, it should be appreciated, that, if deemed necessary, as will in most instances be the situation, an outer coating of cement or the like similar to the coating 30, can be provided on any of the sleeves illustrated in FIGS. 5 through 11.

With regard to the locking features associated with the sleeves of FIGS. 7 through 11, while these sleeves would not provide for the formation of an expanded grout "wedge," the intimate engagement of the grout, through the expansion thereof, with and about the internally exposed wires, as well as the ribs on the reinforcing bars to be joined thereby, will result in a positive tension accommodating joint. The sleeves of FIGS. 5 and 6 will of course include the additional advantages of the wedge effect and the compressive force developed by the sleeve itself against the received bars upon the introduction of a force to the bars which tends to elongate or straighten out these sleeves.

Referring again momentarily to FIG. 16, it will be appreciated that the sleeve 60 has been illustrated therein, with a grout retaining coating 30 thereabout, as a means for interconnecting a pair of exposed rods 26.

Turning now specifically to FIGS. 12 through 15, two additional forms of splice sleeve 70 and 72 have been illustrated therein. These sleeves 70 and 72, the sleeve 70 being of the tapered configuration illustrated in conjunction with the forms of FIGS. 1, 5 and 6 and the sleeve 70 being of the cylindrical configuration illustrated in conjunction with the sleeves of FIGS. 7–11, differ primarily from the previously discussed sleeves in that the coils 74 and 76 thereabout are in direct surface-to-surface contact or engagement with each other throughout the full height of the sleeve, either 70 or 72. These coils can be either defined by a continuous spiralling or helicoidal strip of wire, or can consist of independent annular coils or rings stacked on each other. In either event, a closed sleeve is produced which eliminates the necessity of providing a coating, such as coating 30, about the exterior of the sleeve. By the same token, multiple internal grooves are defined along the full length of both types of sleeves 70 and 72 into which the expanding grout can expand so as to provide for a positive locking engagement with the sleeve in addition to a similar positive locking engagement with the ribbed rods received within the sleeve. It will be noted that both sleeves 70 and 72, as illustrated, have the associated generally vertically extending wires 78 and 80 extending along and welded to the exterior of the coils. These vertical wires 78 and 80 can, if deemed desirable, also be provided interiorly of the coils as suggested in the originally discussed forms of sleeve, these vertical rods 78 and 80, in either arrangement, being welded to all of the coils at the points of contact therewith.

From the foregoing, it will be appreciated that a highly unique basic splice sleeve construction has been defined, this construction being in the nature of an elongated hollow wire cage which is adapted to receive the ends of a pair of reinforcing bars axially therein through the opposed ends thereof. The sleeve, in one major configuration thereof, has a body, and more particularly an interior, which tapers substantially constantly from a maximum diameter at a central point between the ends thereof outwardly to a reduced diameter at each of the open ends, the wires which define the body providing means for intimately locking an internally supplied expanding grout thereto. The wires, or at least a portion thereof, are normally supplied in coils, either spirally or annularly about the sleeve, definiing what may be considered a combination of grooves and ribs along the length of the interior of the sleeve, the number of such grooves and ribs increasing as the number of coils increases, resulting in an increase in the number of bearing surfaces into which the expanding grout intimately engages.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A splice joint for reinforcing bars comprising a splice sleeve containing the adjacent ends of a pair of axially aligned reinforcing bars and bar surrounding grout therein for providing a tension accommodating joint between the axially aligned reinforcing bars, said sleeve comprising an elongated hollow grout receiving body having opposed open ends receiving the adjacent ends of the pair of bars to be joined, said body having a substantially fixed interior configuration tapering from a maximum diameter at a central point between the ends outward to a reduced diameter at each of said open ends with the received grout filling the body and assuming a tapered configuration about the sleeve received bars for a wedge locking in the body, said body being defined by a plurality of interconnected wires presenting a series of bearing surfaces along the hollow interior thereof for intimate engagement thereagainst by the body filling introduced grout.

2. The joint of claim 1 including a substantially continuous coating of a hardened rigid cementitious material provided about and interlocked with the body along the full length of the body, said coating defining means for precluding passage of material laterally between the wires, said wires being exposed inwardly of said coating yet held permanently interconnected in a fixed rigid framework so as to retain the original internal configuration and volume of said sleeve.

3. A splice sleeve for providing a tension accommodating joint between reinforcing bars, said sleeve comprising an elongated hollow grout receiving body having opposed open ends for the reception of the adjacent ends of a pair of bars to be joined, said body having an interior configuration tapering substantially constantly from a maximum diameter at a central point between the ends outward to a reduced diameter at each of said open ends, said body being defined by a plurality of interconnected wires presenting a series of bearing surfaces along the hollow interior thereof for intimate engagement thereagainst by introduced grout, and a substantially continuous coating provided about the body defining interconnected wires along the full length of the body whereby passage of material laterally between the wires is precluded, selected ones of said interconnected wires extending approximately longitudinally along the length of said sleeve, the remainder of said wires extending in coils about the longitudinally extending wires along the full length thereof.

4. The sleeve of claim 3 wherein the coils are defined by separate rings of wire positioned at longitudinally spaced points along and secured to the longitudinally extending wire.

5. A splice sleeve for providing a tension accommodating joint between reinforcing bars, said sleeve comprising an elongated hollow grout receiving body having opposed open ends for the reception of the adjacent ends of a pair of bars to be joined, said body having an interior configuration tapering substantially constantly from a maximum diameter at a central point between the ends outward to a reduced diameter at each of said open ends, said body being defined by a plurality of interconnected wires presenting a series of bearing surfaces along the hollow interior thereof for intimate engagement thereagainst by introduced grout, selected ones of said interconnected wires extending approximately longitudinally along the length of said sleeve, the remainder of said wires extending in coils about the longitudinally extending wires along the full length thereof.

6. The sleeve of claim 5 wherein said coils are positioned in abutting intimate engagement with each other so as to provide a continuous closed surface about the hollow interior of the body in conjunction with multiple inwardly directed grout receiving grooves.

7. A splice sleeve for providing a tension accommodating joint between reinforcing bars, said sleeve comprising an elongated hollow grout receiving body having opposed open ends for the reception of the adjacent ends of a pair of bars to be joined, said body being defined by a plurality of interconnected crossing wires presenting a series of bearing surfaces along the hollow interior thereof for intimate engagement thereagainst by introduced grout, selected ones of said interconnected wires extending approximately longitudinally along the length of said sleeve, the remainder of said wires extending in coils about the longitudinally extending wires along the full length thereof, the longitudinally extending wires being slightly convex, bulging outward at the midsection along the length thereof so as to define a body having a maximum diameter at the center thereof and minimum diameters at the opposed ends thereof.

8. The sleeve of claim 7 wherein said coils are positioned in abutting intimate engagement with each other so as to provide a continuous closed surface about the hollow interior of the body in conjunction with multiple inwardly directed grout receiving grooves.

9. The sleeve of claim 3 wherein said wires, at the points of crossing, are welded to each other.

10. The sleeve of claim 7 including a substantially continuous coating of cementitious material provided about the exterior of the body-forming wires along the full length of the body, said coating defining means for precluding passage of material laterally between the wires.

11. In concrete construction, a splice joint for reinforcing bars including a splice sleeve, said sleeve comprising an elongated hollow body having opposed open ends within which are received the adjacent ends of a pair of bars to be joined, said body containing a bar surrounding and binding cementitious grout, said body being substantially inflexible and defined by a plurality of interconnected crossing wires, a substantially continuous coating of hardened rigid cementitious material provided about and interlocked with the exterior of the body-forming wires along the full length of the body, said coating defining means for precluding passage of material laterally between the wires, said wires being inwardly exposed, projecting inwardly of said coating and presenting a series of bearing surfaces along the hollow interior of the body intimately engaged by the body contained grout.

References Cited

UNITED STATES PATENTS

| 1,001,682 | 8/1911 | Pratt | 285—294 |
|---|---|---|---|
| 1,035,816 | 8/1912 | Allen | 287—108 |
| 1,213,589 | 1/1917 | Collings | 287—108 |
| 1,802,665 | 4/1931 | Monteux | 285—294 |
| 3,040,402 | 6/1962 | Rible | 24—123.5 |
| 3,067,401 | 12/1962 | Rhodes | 24—123.5X |
| 3,186,048 | 6/1965 | Tann | 24—123.5X |

DAVID J. WILLIAMOWSKY, Primary Examiner

A. V. KUNDRAT, Assistant Examiner

U.S. Cl. X.R.

24—123.5; 52—232, 432, 722